Feb. 29, 1944. T. BROWN 2,342,837
CONTROL DEVICE FOR MANURE SPREADERS AND THE LIKE
Filed Dec. 3, 1941 2 Sheets-Sheet 1

INVENTOR
THEOPHILUS BROWN
ATTORNEY

Feb. 29, 1944.  T. BROWN  2,342,837
CONTROL DEVICE FOR MANURE SPREADERS AND THE LIKE
Filed Dec. 3, 1941  2 Sheets-Sheet 2
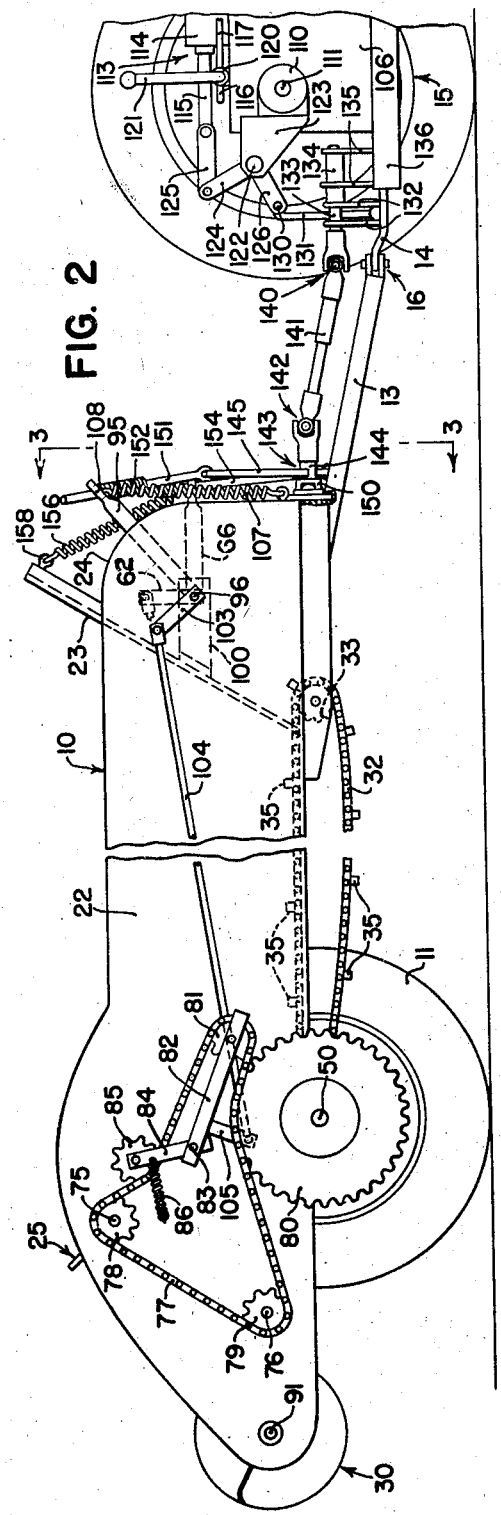
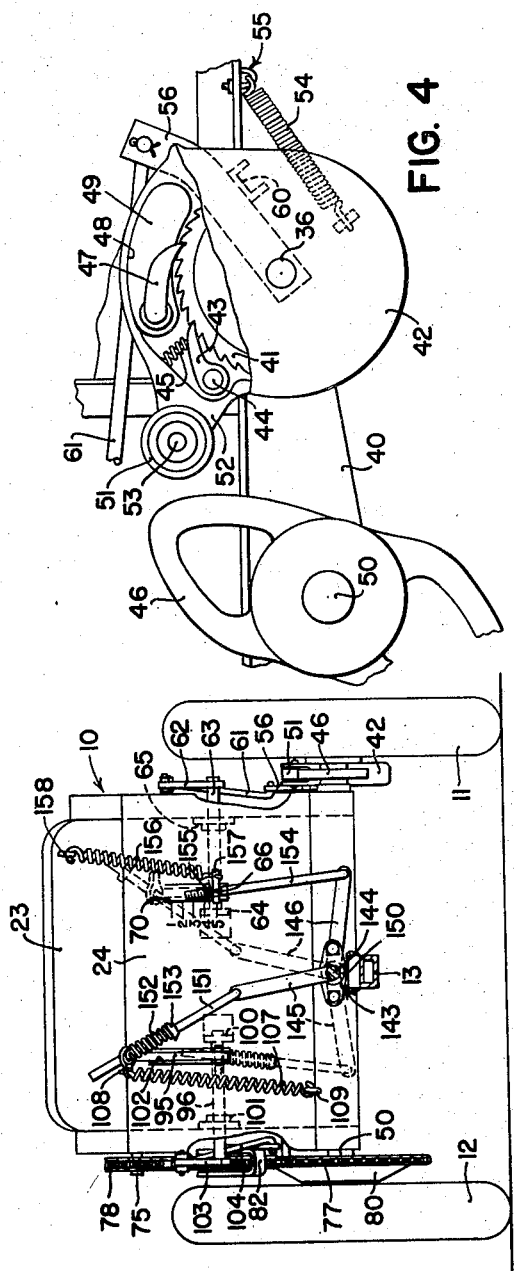
INVENTOR
THEOPHILUS BROWN
ATTORNEYS Patented Feb. 29, 1944

2,342,837

UNITED STATES PATENT OFFICE 2,342,837

CONTROL DEVICE FOR MANURE SPREADERS AND THE LIKE

Theophilus Brown, Moline, Ill., assignor to Deere & Company, Moline, Ill., a corporation of Illinois Application December 3, 1941, Serial No. 421,431

18 Claims. (Cl. 275—5)

The present invention relates to agricultural implements and has particularly to do with a device for actuating the controls of a tractor drawn implement in a particular sequence when starting and stopping the operating mechanism. In manure spreaders, for example, there is one lever controlling the operation of the beater and widespread mechanism, and a second lever controlling the operation of the feed conveyor mechanism. It is advisable when starting the mechanism to engage the beater and widespread first before starting the feed conveyor so that the beaters will be running at full speed when the manure is first fed thereto and will be able to shred and distribute the manure without jamming. Likewise, when the mechanism is to be stopped, the feed conveyor is stopped first so that the beaters will be able to clear themselves before they are stopped. If this sequence of starting and stopping the mechanism is not observed, there is danger of damaging the beaters or the driving mechanism by engaging the drive when the teeth of the beater are embedded in the body of manure on the wagon.

It is the principal object of the present invention, therefore, to provide a single control device operative to actuate the controls of an implement in a particular sequence when it is desired to start or stop the machine.

Another object of the invention is to provide means for operating the controls on the implement by mechanism controlled from the tractor. More specifically, the present invention contemplates using the power lift mechanism on the tractor to operate the controls on the implement towed behind.

Still a further object of the invention relates to the provision of a device driven and controlled from the tractor for starting and stopping both the beater mechanism and the feed mechanism and operative to regulate the rate of feed of the feed mechanism. This feature of the invention provides complete control over the operation of the mechanism on the manure spreader without requiring the operator to turn away from the tractor controls or to reach back for control levers on the implement.

These and other objects and advantages of my invention will become apparent to those skilled in the art after consideration of the following detailed description of the preferred embodiment thereof, reference being had to the accompanying drawings, in which Figure 1 is a top plan view of a tractor-drawn manure spreader having a control device constructed according to the principles of my invention;

Figure 2 is a side elevation of the same, with the rear wheels of the spreader and of the tractor removed;

Figure 3 is a view of the front end of the spreader, as taken along the line 3—3 in Figure 2;

Figure 4 is an enlarged detail view of the mechanism for driving the feed conveyor;

Figure 1:
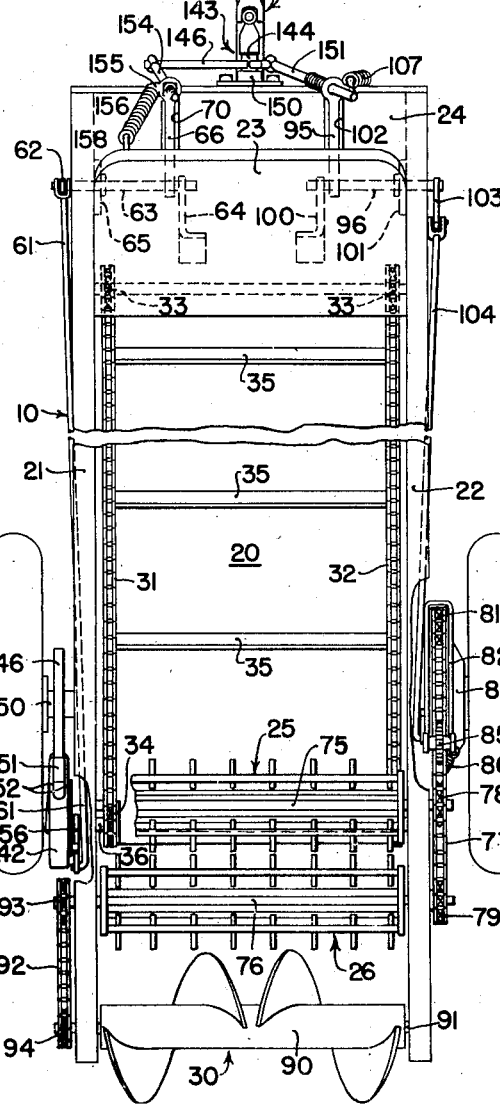

Referring now to the drawings, the invention is illustrated on a tractor drawn manure spreader of the type comprising a generally rectangularly shaped box body 10 supported at the rear end on a pair of laterally spaced wheels 11 and 12, and at the front end on a draft tongue 13 which is adapted to be hitched to the drawbar 14 of a tractor 15 by means of a clevis 16. The body of the manure spreader includes a bottom 20 and a pair of vertical sides 21 and 22. A rearwardly inclined dashboard 23 extends transversely across the front end of the body from side to side, and ahead of the dashboard is a forwardly and downwardly curved front hood 24 which likewise extends from one side of the spreader body to the other side thereof.

The manure which is carried in the body of the spreader is fed rearwardly into a pair of transversely disposed rotary beaters 25 and 26 at the rear end of the body that break up and shred the manure and toss it against a rotary widespread 30 which scatters the shredded manure over the ground. The feeding mechanism for moving the load of manure rearwardly into the beaters is preferably of the endless belt conveyor type comprising a pair of laterally spaced chains 31 and 32 trained over sprockets 33 and 34 at the front and rear ends, respectively, of the body, and having slats 35 fixed thereto at intervals. The rearwardly traveling upper run of the belt conveyor rests on the wagon bottom 20, and the lower run of the conveyor travels forwardly underneath the wagon bottom.

The rear sprockets 34 drive the conveyor, and to this end they are mounted on a transverse shaft 36 which is journaled in bearing brackets 40 fixed to the spreader bottom at opposite sides thereof. The left hand end of the shaft 36 projects outwardly beyond the left side wall 21 of the body, and has a ratchet wheel 41 fixed to its outer end. The ratchet wheel 41 is enclosed within a housing 42 which is journaled on the shaft 36, and the teeth of the ratchet are engaged by a pawl 43 journaled on a pin 44 fixed to the housing wall. A spring 45 presses the pawl down against the ratchet teeth, and when the housing is rotated in a clockwise direction, as viewed in Figure 4, the ratchet wheel is engaged by the pawl and caused to rotate therewith, whereas, when the housing is rotated in a counterclockwise direction, the pawl ratchets freely over the teeth. The ratchet wheel 41 is held against reverse movement during the counterclockwise return movement of the housing by a lock pawl 47 which is journaled in a suitable bearing on the spreader body and extends laterally inwardly through a curved slot 48 in the adjacent side wall of the housing. A curved cover plate 49 is journaled on the shank portion of the pawl 47 and slidably engages the side of the housing adjacent the edges of the slot, said cover plate being held against the housing by a suitable spring (not shown).

The housing 42 is oscillated to advance the ratchet wheel 41 by means of a two-lobed cam 46 which is fixed to the axle 50 on which the wheels 11, 12 are mounted. The axle 50 is journaled in the bearing brackets 40 and is operatively connected with the wheels 11, 12 to rotate therewith when the implement travels forwardly. The cam 46 engages a roller 51 which is disposed between a pair of laterally spaced ears 52 on the outside of the housing and is journaled on a pin 53 extending through aligned holes in the ears. A spring 54 is anchored at 55 to the spreader body and is attached to the housing 42 so as to exert a force on the same tending to hold the roller 51 against the cam. As the cam 46 rotates with the axle, the roller 51 follows the contour of the cam and thereby causes the housing 42 to rock back and forth on the shaft 36. Each time the housing rocks in a clockwise direction, the pawl 43 picks up one or more teeth on the ratchet wheel and thus rotates the drive sprockets 34 to feed the manure rearwardly into the beaters 25, 26.

The rate at which the material is fed to the beating and distributing mechanism is governed by adjusting the angular distance through which the housing 42 rocks, so as to increase or decrease the number of teeth picked up by the pawl 43 during each revolution of the cam. Thus, for the minimum rate of feed, the pawl 43 would pick up only one tooth during each oscillation of the housing, whereas for the maximum rate of feed, the pawl might pick up five or six teeth, depending on the radial distance between the highest and lowest points on the cam 46. The amount of angular movement of the housing 42 is regulated by an arm 56 journaled on the shaft 36 between the housing and the spreader body, which engages a limit stop 60 on the adjacent face of the housing to limit the counterclockwise or return movement of the housing so that the roller 51 is prevented from following the contour of the cam to the lowest point thereof. By positioning the arm 56 so that the roller is engaged by the high portion only of the cam. it is possible to obtain any desired rate of feed less than the maximum. When the feeding mechanism is to be stopped entirely, it is necessary only to shift the feed control arm 56 so that the roller 51 is held entirely out of reach of the cam 46. An operating rod 61 is pivotally connected with the free end of the arm 56 and extends forwardly therefrom to connect with a lever arm 62 which is mounted on the outer end of a transverse shaft 63 disposed within the space enclosed by the inclined dash 23 and curved hood 24. The shaft 63 is journaled in bearing brackets 64 and 65 which are fixed to the dashboard 23 and left side wall 21, respectively, and the said shaft is adjustable by the operator through a control device, preferably in the form of a lever 66 fixed to the shaft and extending upwardly and forwardly therefrom through a vertical slot 70 in the curved portion of the front hood 24. One side of the slot 70 is marked off in divisions (see Figure 3) indicating positions of the lever 66 for various rates of feed, and when the lever is at the top of the slot, the feeding mechanism is stopped entirely.

Turning now to the beater and spreader mechanism, the rotary beaters 25 and 26 are mounted on transverse shafts 75 and 76, respectively, which are journaled in suitable bearings fixed to the side walls of the spreader body. The shafts 75, 76 are driven from the axle 50 by means of a chain 77 which is trained around sprockets 78 and 79 fixed to the shafts 75, 76, respectively, and over the top of a large driving sprocket 80 fixed to the axle 50 adjacent the right hand wheel 12. The chain 77 is also trained around a sprocket 81 journaled on the free end of an arm 82 which is pivoted on a shaft 83 on the spreader body for vertical swinging movement. When the arm 82 is raised, the chain 77 is lifted clear of the driving sprocket 80 thereby disconnecting the drive to the beaters 25, 26. Journaled on a second arm 84 that is also pivoted on the shaft 83 is a chain tightener sprocket 85 which is urged down into engagement with the chain by a spring 86 fastened to the spreader body.

The rotary widespread 30 may be of any well-known type, and in the illustrated implement it comprises a drum 90 mounted on a transverse shaft 91 and having oppositely directed spiral vanes wound thereon. The shaft 91 is journaled in suitable bearings on the spreader body and is driven from the beater shaft 76 by a chain 92 trained around sprockets 93 and 94 fixed to the shafts 76 and 91, respectively. Since the widespread 30 is connected directly with the beater shaft 76, it follows that the widespread and beaters operate in unison.

The operation of the beater and widespread is controlled by a control device in the form of a lever 95 fixed to the inner end of a transverse shaft 96 disposed within the space enclosed by the dashboard 23 and front hood 24, coaxial with the shaft 63. The shaft 96 is journaled in bearing brackets 100 and 101 which are fixed to the dashboard 23 and right side wall 22, respectively, and the lever 95 extends upwardly and forwardly from the shaft through a vertical slot 102 in the curved portion of the front hood. A lever 103 is fixed to the outer end of the shaft 96 on the outside of the wall 22, and a rearwardly extending connecting rod 104 is pivotally connected to the free end of the lever. The rear end of the connecting rod is pivoted to a downwardly extending lever arm 105 which is fixed to the arm 82. Thus, when the control lever 95 is swung downwardly, the connecting rod 104 is pulled forwardly by the lever arm 103, rocking the arms 105, 82 in a counterclockwise direction about the shaft 83 to raise the driving chain out of contact with the sprocket 80 and thereby stop the operation of the beaters and widespread. The control lever 95 is yieldingly held at the bottom of the slot 102 in inoperative position by means of a spring 107 which is attached at one end to a lug 108 projecting laterally from the lever 95 and is fastened at the other end to an eye bolt 109 at the bottom of the front hood 24.

The control levers 66 and 95 are operated in the desired sequence by mechanism deriving its power from the tractor engine. The tractor 15 is a conventional type of tractor and includes a body 106 having laterally outwardly extending rear axle housings 110 in which axles 111 are journaled. Driving wheels 112 are mounted on the outer ends of the axles 111. The tractor is provided with power lift mechanism 113 comprising a fore and aft extending cylinder 114 mounted on the tractor body, a piston (not shown) within the cylinder, and a piston rod 115 projecting rearwardly from the end of the cylinder. Fluid under pressure is introduced into either end of the cylinder 114 through pipes 116, 117, by means of a two-way valve 120, causing the piston and rod to move toward the opposite end of the cylinder. The valve 120 is operated by a control lever 121, and the piston rod may be stopped at any point in its travel by bringing the control lever 121 to a neutral position which closes the passages to both ends of the cylinder and thereby locks the piston against further movement. A transversely disposed rock shaft 122 is journaled in bearing brackets 123 which are bolted to the back sides of the axle housings 110. An upwardly extending lever arm 124 is fixed to the rock shaft 122 and is connected to the piston rod 115 by a link 125 so that the shaft is rocked by the piston rod when the power lift is actuated. A pair of axially spaced, rearwardly extending arms 126 are fixed to the rock shaft 122, and pivotally supported between the outer ends of the arms is a trunnion block 130 which is apertured to receive the forwardly turned upper end of a link 131. The lower end of the link 131 is disposed between and pivoted to a pair of laterally extending arms 132 which are fixed to a fore and aft extending shaft 133 disposed directly above the tractor drawbar 14. The shaft 133 is journaled at its forward end within a tube 134 which is welded to a pair of bracket members 135 that are fixed, in turn, to the draft frame 136 of the tractor. The rear end of the shaft 133 is connected by a universal joint 140 to a square telescopic shaft 141.

A second universal joint 142 connects the rear end of the shaft 141 to a rotatable bell crank member 143 which, in the preferred embodiment, consists of a short stub shaft 144 having a pair of angularly spaced arms 145 and 146 welded thereto. The shaft 144 is journaled in a bearing member 150 which is bolted to the front end of the spreader body immediately above the draft tongue 13.

Arm 145 is connected with the beater control lever 95 by means of a lost motion connection comprising a rod or link 151 which is pivoted to the outer end of the arm 145 and is slidably received within an aperture formed in the outer end of the lever 95. A compression spring 152 embraces the link 151 and bears at one end against a shoulder 153 on the link and at the other end against the lever 95. The normal strength of the spring 152 is sufficient to move the lever 95 from inoperative position to operative position against the tension of the spring 107 without yielding to a very considerable extent when the shaft 144 and arm 145 are rotated from the initial, or first position shown in Figure 5, to the intermediate, or second position shown in Figure 6. In this second position the lever 95 engages the upper end of the slot 102 and is thereby prevented from moving further, so that continued clockwise movement of the arm 145 toward the terminal, or third position shown in Figure 7, causes the link 151 to slide through the aperture in the end of the lever 95 while the spring 152 yields to permit such relative movement. From the foregoing it is seen that the beater mechanism control lever 95 is actuated only while the member 143 rotates between first and second positions, and remains stationary while the member rotates between second and third positions. When the member 143 rotates counterclockwise from second position to first position, the spring 107 pulls the control lever 95 down to inoperative position at the bottom of the slot 102.

Figure 6:
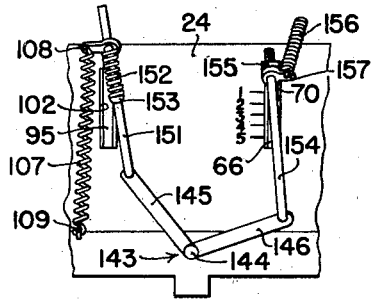
Figure 7:
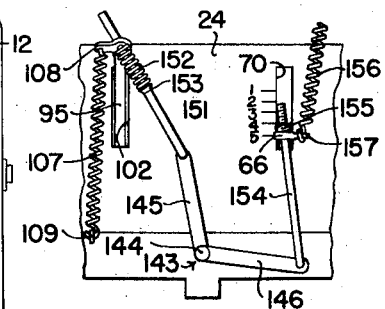

Arm 146 of the bell crank member 143 is connected with the feed control lever 66 through a lost motion connection comprising a rod or link 154 which is pivoted to the outer end of the arm 146 and slidably projects through an aperture formed in the outer end of the lever 66. The end of the rod 154, projecting above the lever 66, is threaded and has a nut 155 screwed thereon, which engages the lever 66 to pull the latter downwardly when the member 143 rotates from second position to third position, as shown in Figures 6 and 7, respectively. When the member 143 rotates between first and second positions, however, the link 154 merely slides freely through the aperture in the control lever 66, and the said control lever remains stationary. A tension spring 156 is attached at one end to a lug 157 projecting laterally from the lever 66 and is fastened at the other end to an eye bolt 158 at the top of the dashboard 23 for yieldingly holding the lever 66 at the top of the slot 70 in inoperative position.

Figure 5:
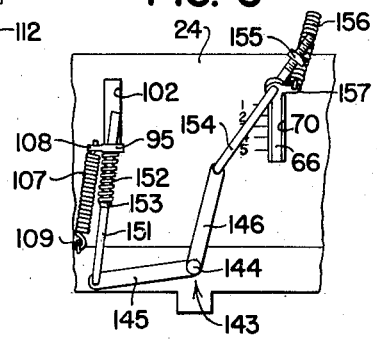
Figures 5, 6 and 7 are diagrammatic views of the control device, showing the manner in which the beater and feed conveyor controls are successively operated as the actuating member is turned from extreme left to extreme right position.

Referring now to Figures 5, 6 and 7, it will be noted that when the member 143 is in its first position (Figure 5) the arm 145 and link 151 are substantially at right angles, while the arm 146 and link 154 are substantially at dead center. By virtue of this arrangement, the control lever 95 is made to move through the maximum angular distance as the member 143 rotates from first to second position, while at the same time there is a minimum of lost motion movement between the link 154 and control lever 66. As the member 143 approaches second position (Figure 6) the arm 145 and link 151 approach dead center, while the arm 146 and link 154 approach right angles. At this point, the control lever 95 strikes the top of the slot 102 and is stopped from further movement, while at substantially the same instant, the nut 155 on link 154 engages the lever 66. Continued movement of the member 143 from second position to third position (Figure 7) causes the arm 145 and link 151 to move past dead center while the spring 152 yields to permit lost motion between the link 151 and control lever 95. At the same time, the control lever 66 is pulled down by the link 154 to one of the feed regulating positions indicated along the side of the slot 70, thereby starting the feed mechanism in operation.

The movement of the bell crank member 143 is continuous from its initial position to its terminal position, and the intermediate or second position shown in Figure 6 is merely the instantaneous position at which the actuation of the beater control lever stops and the actuation of the feed control lever begins. The third, or terminal position is, of course, variable and depends upon the point at which the power lift mechanism 113 is stopped by the operator. With certain types of power lift mechanisms such as, for example, the one shown in my Patent No. 2,286,256, issued June 16, 1942, the mechanism can be adjusted to stop automatically at any predetermined point in its normal cycle of operation, and such mechanisms used in conjunction with the present invention enable the operator to return the feed control lever 66 each time to the same rate-of-feed adjustment by merely starting the operation of the power lift.

It is believed that the operation of my invention and the advantageous features thereof will be clearly understood from the foregoing description, and what I claim is:

1. In combination, a pair of control devices, a member movable successively between a first position, a second position, and a third position, a lost motion connection between said member and one of said devices for operating the latter when the member moves between said first and second positions, and a second lost motion connection between said member and the other of said devices for operating the latter when the member moves between said second and third positions.

2. In combination, a pair of control devices, each of said devices being movable between an inoperative position and an operative position, a member movable successively between a first position, a second position, and a third position, means connecting said member with one of said devices for moving the latter between inoperative and operative positions when said member moves between said first and second positions, said connecting means including lost motion means permitting movement of said member between said second and third positions without moving said one device, and means connecting said member with the other of said devices for moving the same between inoperative and operative positions when the member moves between said second and third positions, said last named connecting means including lost motion means permitting movement of said member between said first and second positions without moving said other device.

3. In combination, a pair of control devices movable between inoperative and operative positions, a member journaled for rotation between a first position, a second position, and a third position, a crank arm on said member, means connecting said crank arm with one of said devices for moving the latter from inoperative to operative position when said member rotates from said first position to said second position, said connecting means including a lost motion connection permitting the member to move from said second position to said third position without moving said one device, said connecting means and said crank arm approaching dead-center relation as said member approaches said second position, whereby there is a minimum of lost motion between the connecting means and said one device when the member rotates between second and third positions, and means connecting said member with the other of said devices for moving the latter from inoperative to operative position when said member rotates from said second position to said third position.

4. In combination, a pair of control devices, a member movable between an initial position, an intermediate point, and a terminal position, means connecting said member with said control devices for operating one of the devices in one direction when the member is moved from said initial position to said intermediate point and for operating the other device in one direction when the member is moved from said intermediate point to said terminal position, said connecting means being operative to actuate said other device in the other direction when said member is moved from said terminal position to said intermediate point and to actuate said one device in the other direction when the member is moved from said intermediate point to said initial position.

5. In combination, a pair of control devices, a member rotatable between an initial position and a terminal position, said member having a pair of angularly spaced crank arms, a link connecting one of said crank arms with one of said control devices, and a second link connecting the other of said crank arms with the other control device, said links being operative to actuate said one control device first and said other control device thereafter when said member is rotated from said initial position to said terminal position, said crank arms being arranged on said member so that when either of said links is at right angles to its respective crank arm, the other link and its associated crank arm are substantially at dead-center relation.

6. In combination, a pair of control devices, a member rotatably supported for movement between an initial position, an intermediate point, and a terminal position, a pair of crank arms on said member, a link conecting one of the crank arms with one of said control devices for operating the latter when said member moves from said initial position to said intermediate point, means providing for lost motion between said member and said one control device during movement of the member from said intermediate point to said terminal position, a second link connecting the other crank arm with the other of said control devices for operating the same when said member moves from said intermediate point to said terminal position, and means providing for lost motion between said member and said other control device during movement of the member from said initial position to said intermediate point, said crank arms being arranged on said member so that said one crank arm and its associated link pass over dead-center during movement of the member between said intermediate point and said terminal position, and said other crank arm and its associated link pass over dead-center during movement of the member between said initial position and said intermediate point, whereby lost motion between said member and each of said control devices is minimized.

7. In a manure spreader having beater mechanism, a control device operatively connected therewith for starting and stopping the mechanism, feed mechanism for feeding the manure to said beater mechanism, a second control device operatively connected with said feed mechanism for starting and stopping the same, a member supported for movement between a first position, a second position, and a third position, means connecting said member with said first named control device for starting said beater mechanism when the member moves between said first position and said second position, and means connecting said member with said second control device for starting said feed mechanism when the member moves between said second position and said third position.

8. In a manure spreader having beater mechanism and feed mechanism for feeding manure thereto, a member movable between a first position, a second position, and a third position, a first control device operative to start said beater mechanism when said member is moved from said first position to said second position, a second control device connected with said feed mechanism and movable from a feed-stop position to a plurality of feed-regulating positions, said second control device being actuated by said member during movement of the latter from said second position to said third position, and means for moving said member from said first position to a predetermined point between said second and third positions whereby said first control device is actuated to start said beater mechanism and said second control device is thereafter moved to a selected rate-of-feed adjustment.

9. In combination with a tractor and an implement connected therewith, mechanism on said implement operated by a pair of control levers, a power actuated member on the tractor movable between an initial position and a terminal position, and means connecting said power actuated member with said control levers on the implement for actuating one of said levers by movement of said power actuated member from said initial position to an intermediate point and for actuating the other lever by movement of the power actuated member from said intermediate point to said terminal position.

10. In combination with a tractor and a manure spreader connected therewith, beater mechanism on said manure spreader, a first control device connected with said beater mechanism for starting and stopping the same, feed mechanism on said manure spreader, a second control device connected with said feed mechanism and movable between a feed-stop position and a plurality of feed-regulating positions, a power actuated member on said tractor movable between an initial position and a terminal position, control means for stopping said member at will between said positions, and means connecting said member with said control devices for actuating said first control device to start said beater mechanism, and for actuating said second control device thereafter to start said feed mechanism, the rate of feed of said feed mechanism being regulated by stopping said member on the tractor at any predetermined point intermediate said initial and terminal positions.

11. In combination with a tractor having a power lift mechanism of the type including a member movable from one extreme position to another and capable of being stopped at any intermediate point between such extremities, a manure spreader hitched to said tractor and having beater and feed mechanisms, a first control device connected with said beater mechanism and movable between positions operative to start and stop the mechanism, a second control device connected with said feed mechanism and movable between a stop position and a plurality of feed-regulating running positions, a part on said manure spreader movable between first, second, and third positions, means connecting said part with said control devices for actuating said first control device to start the beater mechanism when the part is moved from said first position to said second position and for actuating said second control device to start the feed mechanism when the part is moved beyond said second position, the rate of feed of said feed mechanism being proportional to the extent of movement of said part from said second position to said third position, and means connecting said member on the tractor with said part on the manure spreader whereby said part can be moved from said first position to any predetermined point between said second and third positions by actuating said power lift mechanism.

12. In combination with a tractor having a power lift mechanism including an operating member movable between two extreme positions and control means for stopping said member at any intermediate point between said extreme positions, a manure spreader hitched to said tractor to be towed thereby, beater and feed mechanisms on said manure spreader, a first control device operative to start and stop said beater mechanism, a second control device connected with said feed mechanism and movable between a stop position and a plurality of feed-regulating positions, a rotatable member journaled on said manure spreader for movement between a first position, a second position, and a third position, a pair of angularly spaced crank arms on said member, first link means connecting one of said crank arms with said first control device for operating the latter to start the beater mechanism when said member moves from said first position to said second position, said link means providing for lost motion between said one crank arm and said first control device when said member moves beyond said second position, second link means connecting the other of said crank arms with said second control device for operating the latter to start the feed mechanism when said member moves beyond said second position, said second link means providing for lost motion between said other crank arm and said second control device when said member moves from first to second position, said crank arms being arranged on said member so that when the member is in said first position said one crank arm and first link means are substantially at right angles and said other crank arm and second link means are substantially at dead-center, and when the member is in said second position said one crank arm and first control device are substantially at dead-center while said other crank arm and second control device are substantially at right angles, and means connecting the operating member of the power lift mechanism with said member on the manure spreader whereby the latter is rotated when the power lift mechanism is actuated, the rate of feed of said feed mechanism being regulated by stopping the power lift operating member at any predetermined point.

13. In combination with a tractor and an implement associated therewith, mechanism on said implement operated by a pair of control devices, a hydraulic power lift cylinder mounted on said tractor and actuated by power from the tractor engine, control means for said cylinder, and mechanical means connecting said cylinder with said control devices and adapted to separately move first one of said control devices and then the other, sequentially, as said hydraulic cylinder is actuated over its range of operation.

14. In combination with a tractor and an implement associated therewith, a first operative mechanism associated with said implement, a disconnectible device for transmitting power thereto, a second operative mechanism associated with said implement, an adjustable control member therefor, a single power lift device associated with said tractor and connected to receive power from the tractor engine, means for controlling said device over a limited range of movement, and mechanical linkage connecting said device with said operative mechanisms for transmitting the movement of said device from one end of said limited range to the other to first connect said disconnectible power transmitting device and then adjust said adjustable control member.

15. In combination with a tractor and an implement associated therewith, a first operative mechanism associated with said implement, a disconnectible device for transmitting power thereto, a second operative mechanism associated with said implement, an adjustable speed control member for adjusting the speed of said second mechanism from zero to maximum speed, a single power lift device associated with said tractor and connected to receive power from the tractor engine, means for controlling said device over a limited range of movement, and mechanical linkage connecting said device with said operative mechanisms for transmitting the movement of said device from one end of said limited range to the other to first connect said disconnectible power transmitting device and then adjust said adjustable control member to raise the speed of said second mechanism from zero to maximum speed, the return movement of said device over said limited range first reducing the speed of said second mechanism from maximum down to zero speed and then disconnecting said power transmitting device for said first mechanism.

16. In combination with a tractor and an implement associated therewith, a rotatable member associated with said implement for treating material, a disconnectible device for transmitting power thereto, a feeder for moving material to said rotatable member, means for adjustably controlling the speed of said feeder, a single power lift device associated with said tractor and connected to receive power from the tractor engine, means for controlling said device over a limited range of movement, and mechanical linkage connecting said power lift device with said disconnectible device and with said adjustable speed control means for transmitting the movement of said power lift device from one end of its limited range to the other to first actuate said power transmitting device to start said rotatable member and then move said adjustable speed control means to increase the speed of said feeder.

17. In combination, a tractor, a wheel supported implement, draft means connecting said implement to said tractor, a pair of operative mechanisms associated with said implement, control means for each of said mechanisms a single power lift device mounted on said tractor and connected to receive power from the tractor engine a control member for controlling said device, a rotatable shaft mounted on said tractor and extending along said draft means to said implement, said power lift device being connected to said shaft at one end to rotate the latter over a limited range of movement, and mechanical linkage operatively connecting the opposite end of said shaft with said mechanisms for transmitting the movement of said power lift device to actuate first one of said control means and then the other.

18. In combination, a tractor, a wheel supported implement, draft means connecting said implement to said tractor, a first operative mechanism mounted on said implement, a disconnectible device for transmitting power thereto, a second operative mechanism mounted on said implement, an adjustable control member therefor, a single power lift device mounted on said tractor and connected to receive power from the tractor engine, means for controlling said device over a limited range of movement, a flexible rockshaft connected to said power lift device and extending along said draft means to said implement, and mechanical linkages operatively connecting the opposite end of said shaft with said disconnectible device and said adjustable control member for transmitting the movement of said power lift device from one end of said limited range to the other to first connect said disconnectible device and then to adjust said adjustable control member.

THEOPHILUS BROWN.